(12) United States Patent
Scire

(10) Patent No.: US 6,371,497 B1
(45) Date of Patent: Apr. 16, 2002

(54) PERSONAL COMPUTER DOLLY

(76) Inventor: Paulette A. Scire, 2402 Graystone La., Frederick, MD (US) 21702

( * ) Notice: Subject to any disclaimer, the term of this patent is extended or adjusted under 35 U.S.C. 154(b) by 0 days.

(21) Appl. No.: 09/711,141

(22) Filed: Nov. 14, 2000

(51) Int. Cl.$^7$ ............................... B62B 1/00
(52) U.S. Cl. ............................................ 280/42
(58) Field of Search ..................... 280/35, 42, 656, 280/79.11, 11.26; 108/69, 83, 88, 89; 312/208; 403/331, 340

(56) References Cited

U.S. PATENT DOCUMENTS

| | | | | |
|---|---|---|---|---|
| 164,064 A | * | 6/1875 | White | 108/83 |
| 802,998 A | * | 10/1905 | Lambert | 108/83 |
| 1,250,677 A | | 12/1917 | Shannon | |
| 1,284,262 A | | 11/1918 | Druesell | |
| 2,153,262 A | * | 4/1939 | McFall | 108/83 |
| 3,419,317 A | * | 12/1968 | Mutchnik et al. | 384/17 |
| 3,515,077 A | * | 6/1970 | Glowacki | 108/89 |
| 3,633,774 A | * | 1/1972 | Lee | 214/152 |
| 4,166,638 A | * | 9/1979 | De Prado | 280/638 |
| 4,646,654 A | * | 3/1987 | Sullivan | 108/69 |
| 5,299,826 A | * | 4/1994 | Flowers | 280/651 |
| 5,692,722 A | * | 12/1997 | Lundagards | 248/553 |
| 6,203,031 B1 | * | 3/2001 | Leverington | 280/35 |

FOREIGN PATENT DOCUMENTS

| | | |
|---|---|---|
| BE | 518268 | 3/1953 |
| CA | 557283 | 12/1958 |
| DE | 529255 | 6/1931 |

* cited by examiner

*Primary Examiner*—Brian L. Johnson
*Assistant Examiner*—G B Klebe
(74) *Attorney, Agent, or Firm*—Stephen R. Greiner

(57) ABSTRACT

A personal computer dolly including a pair of platform members positioned side by side. A pair of casters is secured to the bottom of each of the platform members for movement of the platform members over a supporting surface. A pair of "L" shaped guide arms extends from one of the platform members. A pair of inverted "L" shaped guide arms extends from the other of the platform members and is in sliding engagement with the pair of "L" shaped guide arms so that the positioning of the platform members can be selectively adjusted.

3 Claims, 1 Drawing Sheet

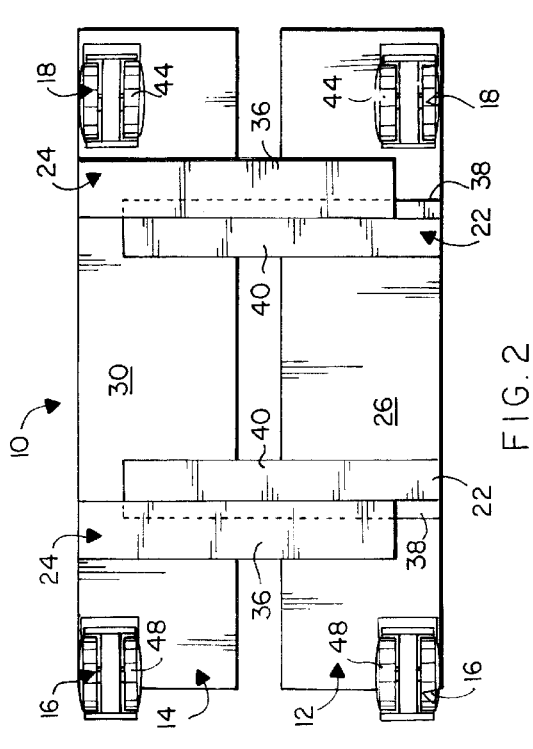
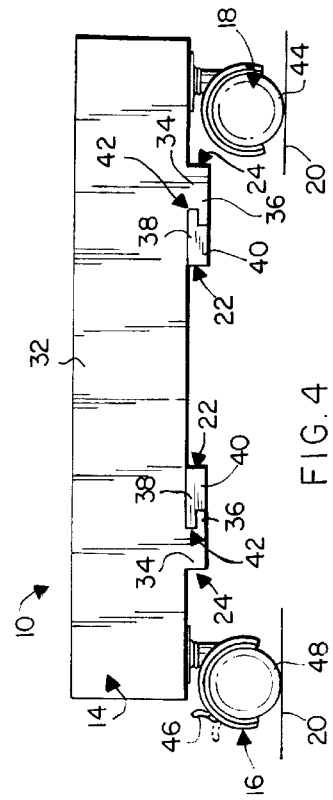
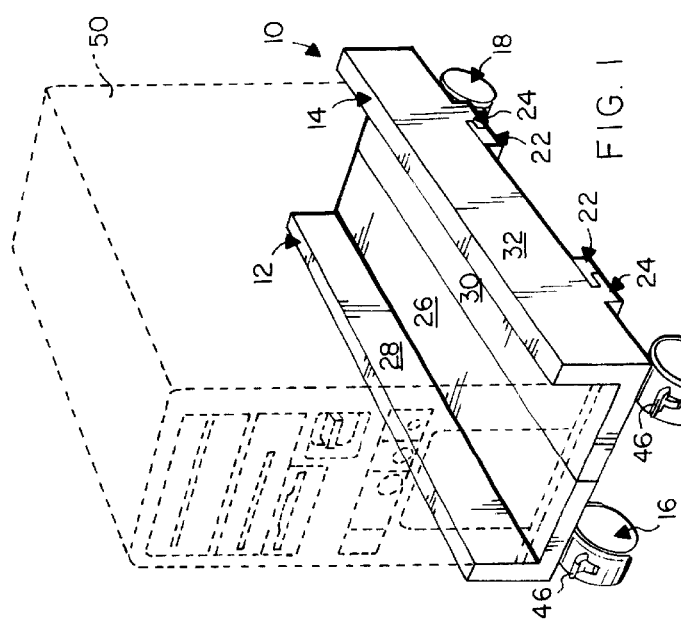
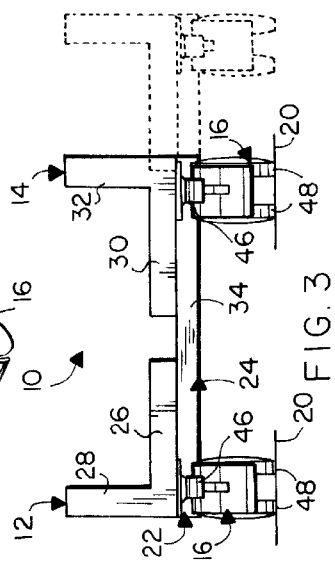

PERSONAL COMPUTER DOLLY

FIELD OF THE INVENTION

The present invention relates generally to wheeled land vehicles having extensible structures.

BACKGROUND OF THE INVENTION

Anyone who has worked with a personal computer (PC) having a desktop-type configuration knows how difficult it can be, at times, to connect peripheral devices to it. The bulky tower containing the PC's central processing unit must often be lifted from a storage position beneath a desk and, then, turned for access to the electrical connectors on its rear side. Not only can such movements be tough on the back of a user but they can be equally damaging to the PC if the tower is inadvertently jarred or dropped.

SUMMARY OF THE INVENTION

In light of the problems associated with conventional desktop-type PCs, it is a principal object of the invention to provide a personal computer dolly that permits the central processing unit-containing tower of a PC to be moved over a supporting surface with ease and safety. Access to all sides of the tower may be had without lifting of any sort. Making connections between the PC tower and peripheral devices such as: keyboards, monitors, speakers and printers is easy and requires only a few seconds.

It is another object of the invention to provide a personal computer dolly of the type described that is fully adjustable so as to accommodate different makes and models of PC towers. One dolly, therefore, can be used with a number of different PC towers over its lifetime.

It is a further object of the invention to provide a dolly that elevates a PC tower above a supporting surface, reducing the likelihood of moisture, dirt, dust or static electricity entering the tower from below. Because the PC tower is elevated, reaching beneath such to dust or clean a supporting surface is easy.

Still another object of the invention is to provide a personal computer dolly that can be selectively locked in place. Thus, a PC tower can only be rolled over a supporting surface when a user chooses.

It is an object of the invention to provide improved elements and arrangements thereof in a personal computer dolly for the purposes described which is lightweight in construction, inexpensive to manufacture, and dependable in use.

Briefly, the personal computer dolly in accordance with this invention achieves the intended objects by featuring a pair of platform members each having a pair of casters secured to its bottom. One pair of guide arms extends from one of the platform members and each is "L" shaped with a horizontal leg secured to a vertical leg and defines a slot between the top of each horizontal leg and the platform member to which it is affixed. Another pair of guide arms with an inverted "L" shape extends from the other of the platform members and are in sliding engagement with the "L" shaped guide arms. Each of the guide arms with the inverted "L" shape has a horizontal leg being slidably positioned within one said slot.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying, drawings, in which:

FIG. 1 is a perspective view of a personal computer dolly in accordance with the present invention shown supporting a conventional PC tower.

FIG. 2 is a bottom view of the personal computer dolly of FIG. 1.

FIG. 3 is a front view of the personal computer dolly.

FIG. 4 is a side view of the personal computer dolly.

Similar reference characters denote corresponding features consistently throughout the accompanying drawings.

DETAILED DESCRIPTION OF THE PREFERRED EMBODIMENT

Referring now to the FIGS., a personal computer dolly in accordance with the present invention is shown at 10. Dolly 10 includes a pair of platform members 12 and 14 each having a pair of casters 16 and 18 secured to its bottom side for movement over a supporting surface 20. Guide arms 22 and 24 extend from platform members 12 and 14. Guide arms 22 affixed to platform member 12 slidably engage guide arms 24 affixed to platform member 14 so that the positions of platform members 12 and 14 relative to one another may be adjusted.

Each platform member 12 and 14 is "L" shaped in cross section. As shown, platform member 12 is provided with a horizontal portion 26 joined at right angles to a vertical portion 28. Platform member 14 is a mirror image of platform member 12 and is similarly provided with horizontal and vertical portions 30 and 32. Platform members 12 and 14 as well as guide arms 22 and 24 may be formed from any suitably rigid material such as wood, plastic or metal.

Guide arms 24 have an "L" shaped cross section, each with a vertical leg 34, whose top abuts the bottom of horizontal portion 30, joined to a horizontal leg 36 at right angles. One end of each guide arm 24 is affixed to horizontal portion 30 so that the free end of each guide arm 24 projects from the side of horizontal portion 30 remote from vertical portion 32. Preferably, the free ends of horizontal legs 36 point toward one another so that their tops form a shelf upon which guide arms 22 may slide.

Each of guide arms 22 has an inverted "L" shape with a horizontal leg 38 whose top is in abutment with the bottom of horizontal portion 26. Joined to, and extending downwardly from, each horizontal leg 38 at right angles is a vertical leg 40. One end of each guide arm 22 is secured to horizontal portion 26 such that the free end thereof projects from the side of horizontal portion 26 remote from vertical portion 28. As shown, the free ends of horizontal legs 38 point away from one another and together form a planar surface for sliding engagement with the coplanar tops of horizontal legs 36.

Horizontal legs 38 of the guide arms 22 rest upon and slide over horizontal legs 36 of guide arms 24. As shown, horizontal legs 38 have a height that is substantially equal to the height of vertical legs 34. Thus, horizontal legs 38 are vertically constrained between the bottom of horizontal portion 30 and the tops of horizontal legs 36, i.e., the tops and bottoms of slots 42.

The outer sides of vertical legs 34 are oriented parallel to one another and vertical legs 40. Vertical legs 34 are spaced from one another at a distance that is substantially equal to the spacing between the free ends of horizontal legs 38 effectively capturing horizontal legs 38 in slots 42. A shearing force across guide arms 22 and 24, therefore, will not separate such from one another.

Casters 16 and 18 are secured in a conventional manner to the bottoms of each platform member 12 and 14. Preferably, casters 18 are of the freewheeling-type and have wheels 44 that are free, at all times, to roll. Casters 16, however, are provided with locking mechanisms, the actuation levers of which are shown at 46, that selectively prevent their wheels 48 from rolling when manually set.

Use of personal computer dolly 10 is straightforward. First, dolly 10 is positioned upon a selected supporting surface 20. Then, with guide arms 22 and 24 engaged. with one another as shown in the FIGS., platform members 12 and 14 are pulled away from each other so that vertical portions 28 and 32 are spaced to receive PC tower 50 therebetween. Then, PC tower 50 is positioned atop horizontal portions 26 and 30. Platform members 12 and 14 are, finally, pressed together so that vertical portions 28 and 32 bear against the sides of PC tower 50. Now, with friction between guide arms 22 and 24 keeping dolly 10 clamped on PC tower 50, PC tower 50 may be rolled in any direction over surface 20. Easy access may be had to any portion of PC tower 50 to connect peripheral devices in the usual way. When rolling motion is no longer desired, the locking mechanisms in casters 16 may be set by pressing downwardly on lever 46 to lock wheels 48 in place.

Should it be desired to transfer dolly 10 to a second PC tower (not shown), the steps outlined in the previous paragraph are first reversed to release PC tower 50 and then repeated with the second PC tower. The entire process of installing dolly 10 on, or removing dolly 10 from, PC tower 50 requires only seconds to perform and requires no tools. No specialized training is needed to perform these tasks.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A personal computer dolly, comprising:
   a pair of platform members positioned side by side;
   a pair of casters secured to the bottom of each of said platform members for movement of said platform members over a supporting surface;
   a first pair of guide arms extending from a first one of said platform members, each of said first pair of guide arms having a first horizontal leg secured to a first vertical leg at right angles, the top of each said first vertical leg being affixed to the bottom of said first one of said platform members so as to form a slot between the top of each said first horizontal leg and the bottom of said first one of said platform members; and,
   a second pair of guide arms extending from a second one of said platform members and being in sliding engagement with said first pair of guide arms, each of said second pair of guide arms having a second horizontal leg secured at right angles to a second vertical leg, the top of each said second horizontal leg being affixed to the bottom of said second one of said platform members, each said second horizontal leg having a height substantially equal to the distance between the top of said first horizontal leg and the bottom of said first one of said platform members, each said second horizontal leg being slidably positioned within one said slot, and each said second vertical leg bearing upon one said second horizontal leg.

2. A personal computer dolly, comprising:
   a pair of platform members each having an "L"shaped cross section with a horizontal portion joined at right angles to a vertical portion
   a pair of casters secured to the bottom of said horizontal portion of each of said platform members for movement of said platform members over a supporting surface;
   a first pair of guide arms extending from a first one of said platform members, each of said first pair of guide arms having a first horizontal leg secured to a first vertical leg at right angles, the top of each said first vertical leg being affixed to the bottom of said horizontal portion of said first one of said platform members so as to form a slot between the top of each said first horizontal leg and the bottom of said horizontal portion of said first one of said platform members; and,
   a second pair of guide arms extending from a second one of said platform members and being in sliding engagement with said first pair of guide arms, each of said second pair of guide arms having a second horizontal leg secured at right angles to a second vertical leg, the top of each said second horizontal leg being affixed to the bottom of said horizontal portion of said second one of said platform members, each said second horizontal leg having a height substantially equal to the distance between the top of said first horizontal leg and the bottom of said horizontal portion of said first one of said platform members, and each said second horizontal leg being slidably positioned within one said slot, and each said second vertical leg bearing upon one said second horizontal leg.

3. A personal computer dolly, comprising:
   a pair of platform members each having an "L"shaped cross section with a horizontal portion joined at right angles to a vertical portion
   a pair of casters secured to the bottom of said horizontal portion of each of said platform members for movement of said platform members over a supporting surface;
   a first pair of guide arms extending from a first one of said platform members, each of said first pair of guide arms having a first horizontal leg secured to a first vertical leg at right angles, the top of each said first vertical leg being affixed to the bottom of said horizontal portion of said first one of said platform members so as to form a slot between the top of each said first horizontal leg and the bottom of said horizontal portion of said first one of said platform members, said first horizontal legs terminating at inwardly-directed free ends that point at one another; and,
   a second pair of guide arms extending from a second one of said platform members and being in sliding engagement with said first pair of guide arms, each of said second pair of guide arms having a second horizontal leg secured at right angles to a second vertical leg, the top of each said second horizontal leg being affixed to the bottom of said horizontal portion of said second one of said platform members, each said second horizontal leg having a height substantially equal to the distance between the top of said first horizontal leg and the bottom of said horizontal portion of said first one of said platform members, each said second horizontal leg being slidably positioned within one said slot, and each said second vertical leg bearing upon one said second horizontal leg, and said second horizontal legs terminating at outwardly-directed free ends that point away from one another.

* * * * *